(12) United States Patent
Nuss et al.

(10) Patent No.: US 9,031,561 B2
(45) Date of Patent: May 12, 2015

(54) METHOD AND SYSTEM FOR OPTIMIZING CELLULAR NETWORKS OPERATION

(71) Applicant: Cisco Technology, Inc., San Jose, CA (US)

(72) Inventors: Ziv Nuss, Tzur Yigal (IL); Ran Wellingstein, Kefar Saba (IL); Ido Susan, Herzeliva (IL)

(73) Assignee: Cisco Technology, Inc., San Jose, CA (US)

( * ) Notice: Subject to any disclaimer, the term of this patent is extended or adjusted under 35 U.S.C. 154(b) by 250 days.

(21) Appl. No.: 13/680,779

(22) Filed: Nov. 19, 2012

(65) Prior Publication Data

US 2013/0143561 A1 Jun. 6, 2013

Related U.S. Application Data

(60) Provisional application No. 61/560,880, filed on Nov. 17, 2011.

(51) Int. Cl.
*H04W 88/02* (2009.01)
*H04W 24/02* (2009.01)
*H04W 24/08* (2009.01)
*H04W 24/10* (2009.01)

(52) U.S. Cl.
CPC .............. *H04W 24/02* (2013.01); *H04W 24/08* (2013.01); *H04W 24/10* (2013.01)

(58) Field of Classification Search
USPC .................. 455/436, 442.1; 370/312, 331
See application file for complete search history.

(56) References Cited

U.S. PATENT DOCUMENTS

| 2004/0085909 | A1 | 5/2004 | Soliman |
| 2005/0064820 | A1 | 3/2005 | Park et al. |
| 2006/0068712 | A1* | 3/2006 | Kroboth et al. ............ 455/67.11 |
| 2008/0139197 | A1* | 6/2008 | Misra et al. .................. 455/423 |
| 2010/0029282 | A1 | 2/2010 | Stamoulis et al. |

* cited by examiner

*Primary Examiner* — Diane Mizrahi
(74) *Attorney, Agent, or Firm* — Patent Capital Group

(57) ABSTRACT

A computing platform is provided including a processor that executes instructions for optimizing operation of a cellular network. When executing the instructions, the computing platform operates (a) to probe for information exchanged between a mobile access network and a core network; (b) to retrieve statistical KPIs generated from a plurality of network elements belonging to the cellular network; (c) to generate a predictive Key Performance Indicator (pKPI) by correlating the probed information with the retrieved statistical KPIs, which enables the computing platform to predict a trend characterizing future performance of network elements such as cells; and (d) to trigger changes in the operation of the cellular network based on the predicted trend. The probing for information exchanged between a mobile access network and a core network is carried out at a rate higher than a rate of retrieving statistical KPIs generated from the plurality of network elements.

18 Claims, 3 Drawing Sheets

METHOD AND SYSTEM FOR OPTIMIZING CELLULAR NETWORKS OPERATION

CROSS-REFERENCE TO RELATED APPLICATIONS

This application claims priority of U.S. Provisional Patent Application No. 61/560,880, filed Nov. 17, 2011, the disclosure of which is incorporated by reference herein in its entirety.

TECHNICAL FIELD

The present invention relates to methods and systems for optimizing operation of cellular networks and more specifically to a system that enables predictive optimization of cellular networks operation.

BACKGROUND

One of the major requirements which every cellular network operator faces is to ensure that the network is operating to its maximum efficiency. As a result, cellular network optimization is a major feature of many modern cellular networks.

In order to guarantee the best possible performance to the cellular network subscribers, the network is periodically optimized so that its resources can be more effectively utilized within the core network and/or the Radio Access Network.

Typically, network optimization is affected by manually modifying network parameters in the Radio and Core Networks based on information that relates to network performance. Such information is retrieved periodically and analyzed by the Operations and Support System (OSS) to derive key performance indicators (KPIs) therefrom. The state of the art KPIs include typical system level (e.g. related to user or cell throughputs) and link level (e.g. various transmission error rates) metrics.

Although KPIs can provide a measure of network performance, presently most used systems are designed for a typical time resolution of 15 minutes or more (i.e. KPIs are generated every 15 minutes or more) due to the fact that the system needs to accumulate data over this time period in order to generate the KPI. In addition, the 15 minutes resolution KPIs are normally exported to a central database in which case there is an additional delay until the data can actually be accessed and contemplated. As such, presently used KPIs provide a time-limited view of network performance which severely limits near real time network optimization.

Several solutions have been proposed in the art for analyzing a wired/wireless communication network to optimize its performance.

U.S. 2005/0064820 describes continuously collecting data from all elements constituting the communication network and analyzing the data to find an element of which performance and/or efficiency deteriorates.

U.S. 2004/0085909 discloses scheduling transmissions in a wireless communication system using historical information and usage patterns of remote users in the system. Usage patterns for users within a system are stored and analyzed to optimize transmissions and resources in the system.

U.S. 2010/0029282 describes collecting various wireless performance metrics by respective network access points as an aggregate measure of the wireless network performance. Aggregated data can be utilized to generate a performance model for the network and for individual access points. Changes to the data are updated to the model to provide a steady-state characterization of network performance. Wireless resources are generated for respective access points in a manner that optimizes wireless performance. Additionally, resource assignments can be updated at various intervals to re-optimize for existing wireless conditions, whether event driven or based on performance metrics. Accordingly, a robust and dynamic optimization is provided for wireless network resource provisioning that can accommodate heterogeneous access point networks in a changing topology.

U.S. 2006/0068712 relates to a method of correlating probed data captured from various interfaces to create a combined picture at a call level. Thus, the method described allows real time distributed analysis and troubleshooting of the data on the interfaces of N radio network controllers from a single location.

U.S. 2008/0139197 discloses providing a probe application by a network server for downloading by a mobile device. The probe application monitors a level of performance for various use applications provided by the network for the mobile device, and reports the monitored level of performance for at least one of the applications to the network server. The network server collates the performance data from the plurality of communication devices and provides resource allocation instructions to the mobile in order to optimize a level of performance for the use applications for the communication device.

However, these prior art solutions do not provide an adequate solution to the problem of optimizing the operations of cellular networks, which the present invention seeks to provide.

SUMMARY OF THE DISCLOSURE

The disclosure may be summarized by referring to the appended claims.

It is an object of the present invention to provide an apparatus and a method for collecting network information sampled at short time intervals (near real time) and when correlated with KPIs, deriving trends to enable predicting future network performance.

It is another object of the present invention to provide an apparatus and a method for optimizing the operation of a cellular network and the Quality of Experience ("QoE") of users in that network, based on performance trends obtained.

It is yet another object of the present invention to provide an apparatus and a method that enable reducing a resource load, without compromising the level of service, in a cellular network based on predicted behavioral trends of network element(s).

Other objects of the invention will become apparent as the description of the invention proceeds.

According to a first embodiment there is provided a computing platform adapted to enable optimizing operation of a cellular network, wherein the computing platform is operative to:

(a) probe for information exchanged between a mobile access network and a core network of the cellular network (e.g. by passive probing or by continuous reading of network trace files);

(b) retrieve statistical KPIs generated from a plurality of network elements belonging to the cellular network;

(c) generate a predictive Key Performance indicator (pKPI) by correlating the probed information with the retrieved statistical KPIs, thereby enabling to predict a trend characterizing future performance of at least one network element belonging to the cellular network; and (d) trigger one or more changes in the operation of the cellular network based on the predicted trend characterizing future performance of the at least one network element belonging to the cellular network, and wherein the probing for information exchanged between a mobile access network and a core network is carried out at a rate which is substantially higher than a rate of retrieving statistical KPIs generated from the plurality of network elements (and optionally collected at EMS/OSS systems).

The term "KPI" is used herein throughout the specification and claims to denote a key performance indicator which is relates to performance measurement. KPI is a metric that provides necessary information to verify that a mission-critical service is monitored so that its availability, performance, and scalability are ensured. It is also a metric that can be used for possible troubleshooting.

As used herein, the term "trend" relates to a general direction in which a value tends to move (up or down). In the present system, a trend is a measurement of information over time to yield a positive or negative change in the value of an indicator of a performance parameter (also referred to herein as a performance indicator). When plotted on a graph, a trend is exemplified in a change in slope of the graph.

The trend of the performance indicator serves, as a marker for the system and/or the network element(s) performance, and more importantly, as a predictor of future system/element performance based on present setting.

According to another embodiment, the probing for information exchanged between a mobile access network and a core network is carried out at near real time intervals, e.g. each of the near real time intervals extends for less than or equal to the duration of a 3GPP standard frame.

In accordance with another embodiment, the one or more changes triggered, are characterized as being preventive activities in the network operation.

By yet another embodiment, the at least entity belonging to the cellular network is at least one wireless cell.

According to still another embodiment, the computing is further operative to monitor a trend of said indicator (pKPI) over a predetermined time period.

In accordance with another embodiment, the one or more changes triggered (affected) in the operation of the cellular network result in a decrease in traffic load being developed at at least one of the wireless cells of the cellular network. Preferably, one or more changes in the operation of the cellular network comprise at least one of the following:
(i) causing users being in either idle or active modes to move from a first congested wireless cell to a second non-congested wireless cell; and
(ii) decreasing area serviced by a base station associated with the first congested wireless cell, thereby reducing the network resource load thereat.

According to another embodiment, the information exchanged between a mobile access network and a core network of the cellular network comprises control information and/or user data information.

According to another aspect there is provided a method for optimizing operation of a cellular network, wherein the method comprises the steps of:
(a) probing for information exchanged between a mobile access network and a core network of the cellular network;
(b) retrieving statistical KPIs generated from a plurality of network elements belonging to the cellular network;
(c) generating a performance indicator (pKPI) by correlating said probed information with said retrieved statistical KPIs, thereby enabling to predict a trend characterizing future performance of at least one network element belonging to the cellular network; and
(d) triggering one or more changes in the operation of the cellular network based on the predicted trend which characterizing the future performance of the at least one network element belonging to the cellular network, and wherein the probing for information exchanged between a mobile access network and a core network is carried out at a rate which is substantially higher than a rate of retrieving statistical KPIs generated from the plurality of network elements.

In accordance with another embodiment of this aspect, the step of probing for information exchanged between a mobile access network and a core network is carried out at near real time intervals, each of which preferably extends for less than or equal to the duration of a 3GPP standard frame.

By yet another embodiment, the one or more changes triggered, are characterized as being preventive activities in the network operation.

In accordance with still another embodiment, the at least entity belonging to the cellular network is at least one wireless cell.

According to another embodiment, the one or more changes triggered in the operation of the cellular network result in a decrease in traffic load being developed at at least one of the wireless cells of the cellular network. Preferably, the one or more changes in the operation of the cellular network comprise at least one of the following:
(i) causing users being in either idle or active modes to move from a first congested wireless cell to a second non-congested wireless cell; and
(ii) decreasing area serviced by a base station associated with the first congested wireless cell, thereby reducing the traffic load thereat.

According to another embodiment, after triggering the change, the next sample(s) of KPIs may serve as a control signal ("feedback") for the change in order to determine the success of the change that had been triggered.

Implementation of the method and apparatus of the present invention involves performing or completing selected tasks or steps manually, automatically, or a combination thereof.

Moreover, according to actual instrumentation and equipment of preferred embodiments of the method and system implementing the present invention, several selected steps could be implemented by hardware or by software on any operating system of any firmware or a combination thereof. For example, as hardware, selected steps of the invention could be implemented by software embedded on chip or an ASIC and be part of that hardware.

As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

For a more complete understanding of the present invention, reference is now made to the following detailed description taken in conjunction with the accompanying drawings wherein.

DETAILED DESCRIPTION

Figure 1:
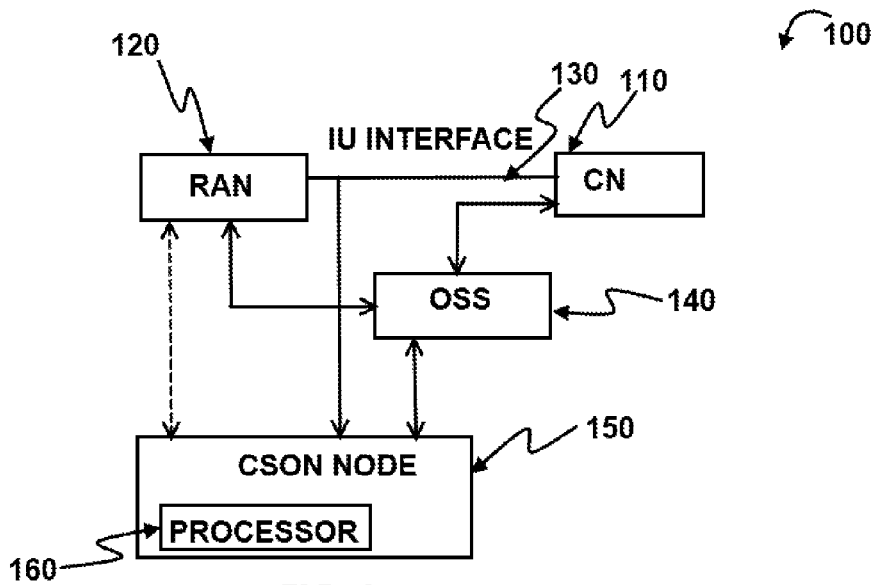
FIG. 1 illustrates implementation of a CSON (Centralized Self Optimization Network) system into a typical cellular network architecture including the main inputs and outputs from the cSON system.

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, certain embodiments and numerous specific details are set forth in order to provide a thorough understanding of the present invention. It should be apparent, however, that the invention is not limited in its application to the details of construction and the arrangement of the components set forth in the following description or illustrated in the drawings and that the present invention may be practiced without these specific details.

As explained hereinabove, one of the main objects of the present invention is to provide a system and method that are used in optimizing the operation of a cellular network, preferably by predicting network performance bottlenecks and proactively modifying network parameters to prevent such bottlenecks.

In current cellular systems, there is an obvious need to optimize network performance in accordance with variables such as traffic patterns, users' mobility patterns, network topology, load, changing end user requirements, field problems, new services launched and the like. If the operation of a cellular network is not being continuously optimized, its performance might degrade, which might lead to dropped calls, insufficient bandwidth causing degradation in the end user Quality of Experience (QoE), where the latter can be expressed by low accessibility, slow response times for data downloads, low retention of calls, etc.

A number of network performance optimization tools are available on the market, both from network infrastructure vendors as well as from specializing suppliers. Although such tools can be used to optimize network performance, they rely upon historical information collected and processed over relatively long periods of time and as such are typically used for modifying network parameters based on past performance and as such, are inherently limited in their ability to support ad hoc short term prediction to effectively address dynamic network performance problems.

Prior art optimization tools typically rely on the following inputs:

OSS statistics, with counters having a typical resolution of 15 minutes or more.

Drive test data—probed in the field, based on few links established by the UEs in the testing vehicle.

Probe information—protocol probing. Normally extensive analysis and correlations are done on the probed data. The outcome of such is discrete counters which are similar to the OSS counters, and are aimed to be either a complementary set of counters that count events/processes which are not covered by the infrastructure vendor OSS counters, or a vendor independent counters (mainly in a multi vendor environment) which are targeted to provide the operator the means to compare it's vendor's performances on the same baseline. The probe analysis may be carried out in an offline mode since it requires handling and processing massive amounts of data for which large storage space is required, and processing time is relatively long for obtaining the necessary data.

Prediction tool data. The radio prediction (planning) tools normally provide a totally different performance metrics set, which are more inclined to radio quality metrics such as coverage or quality metrics (predicted). For example Signal level or Link quality level.

CDR (call data records) or other higher layer databases—are also used as a data source. Those can provide more data about the end to end link status etc, which may be used after the call has terminated.

Call traces, Geographical Cell Traces and/or other traces—those are normally very limited in their geographical scope, when each recording is based only on a certain subset of links or cells which are extensively recorded within a predefined time interval. The information generated is quite similar to that of the probing system, and in addition some more information may be gathered, typically about the internal network elements (e.g. RNC) decisions (sort of a logging and reporting function).

The present invention on the other hand provides a system which utilizes indicator trends derived from information exchanged between the radio access network and core network, and implement these trends to predict future network performance and proactively modify network parameters in order to prevent future network performance degradation.

Thus, according to one aspect of the present invention there is provided a system for optimizing a communication network. The communication network can be any network which requires periodic optimization, preferably, the communication network is a cellular network, for example a cellular network that is compatible with one or more International Recommendations (i.e. Standards) such as 3GPP GSM, UMTS, LTE, 3GPP2 CDMA EVDO, IEEE802.16e/m and the like.

The verb to "optimize" in its various forms (such as "optimizing") as used herein throughout the specification and claims, is used to denote performing planned and targeted changes in radio network topology and Configuration Parameters of base stations, and/or RNCs and/or any other network elements in the RAN (Radio Access Network). Such parameters can be for example power settings, radio resource allocation settings, mobility parameters, neighbor relations, etc.

The system includes a computing platform which is preferably a server grade computer running an operating system such as LINUX. The computing platform includes hardware and software that enable the computing platform to probe for information (signaling information and data traffic) exchanged between a mobile access network and a core network of the cellular network. In that respect, the computing platform includes data exchange ports (e.g. via Ethernet) which are in communication with a communication interface connecting the mobile access network and the core network. Such an interface is for example the Iu interface in a 3G network or the S1 interface in an LTE network, etc.

The computing platform of the present system can be connected to the Iu interface of UTMS networks via RJ45/

TIA568 for R99 system architecture or via Fiber Optical connection for R4 architecture.

The information accessed by the computing platform may be filtered and processed for example by correlating specific protocol messages to specific user ID and identifying call proceedings and specific events per user and/or per cell, and correlating them with parameters related to a performance of at least one cell of the cellular network (or of any other network element for that matter). Such parameters can include, for example, cell loading, drop call rates, accessibility measures, etc. These parameters may be obtained by using performance measurement counters which are used to calculate the KPIs, and that are obtained from the OSS, or calculated directly from the probed data (e.g. the Iu/S1 probed data).

The computing platform can access such information periodically by sampling every several seconds or minutes, or preferably it can collect such information continuously, in which case it essentially mirrors communications between the mobile access network and the core network.

The information collected can be used to generate a database which can then be correlated with performance parameters of the network (KPIs) to continuously derive performance indicators (also referred to herein as pKPIs). These indicators can then be monitored to derive a trend in the information, which trend can be used to predict future performance indicators and thus future network performance.

Depending on the parameter observed, the trend can be derived over a period of seconds to minutes.

For example, in a parameter relating to the amount of traffic in a cell—which can be estimated according to the number of voice call attempts originated at a specific cell—a trend which takes into account the quantity of call attempts over a time period of seconds to minutes, can be used in establishing a prediction on whether the cell traffic is increasing, decreasing and at what rate.

The trending function may also take into account the effect of daily patterns as well as other seasonal patterns effects.

As mentioned hereinabove, the trend derived and monitored by the present system provides useful information relating to current and future system performance.

For example, using the previous example, looking at the number of call attempts, the system can be used to assess the impact of such traffic load on the radio resource associated with the cell. This can be done for example either by instantaneous sampling of the radio resource conditions of the cell and immediately correlating it with traffic information, or by using a pre-stored correlation function which correlates traffic and radio resource loading on a specific cell based on previously collected and processed metrics (which were generated for this specific cell associated with the same radio resources).

Thus, the present invention provides a system that can be used to monitor network performance in near real time and anticipate degradation in network performance based on present network settings. Since the present system enables near real-time and predictive network performance monitoring it can also be used to automatically adjust network settings in order to prevent future bottlenecks in communication and degradation in network performance.

The following exemplifies one implementation of the present system.

FIG. 1 illustrates a typical cellular network architecture 100 which includes the core network ("CN") 110 and the radio access network ("RAN") 120 and their related interface (Iu interface) 130, as well as the operations and support system 140 and its interface with CN and RAN. The computing platform of present system is represented by the Centralized Self Optimization Network (CSON) node 150 shown in this Figure.

As can be seen in FIG. 1, the CSON node 150 is connected to the OSS 140 in a bidirectional connection. The CSON node 150 is operative to provide commands to the OSS for CM (Configuration Management) of the cellular system NEs (Network Elements), and retrieves KPI and PM (Performance Management) information from the OSS.

The CSON node is also connected to the Iu interface via passive probing, or continuous reading (streamline) of accumulated network elements traces (e.g. RNC traces) which constantly record network and UE generated events, enabling continuous real time monitoring of all signaling and data traffic flows exchanged between the core network and the radio access network. The CSON node comprises a processor 160 which is adapted to trigger a function which implements algorithms and logic to analyze the data collected from the various sources and to trigger any relevant Self Optimizing Networks (SON) applications according to predefined and dynamically adaptable thresholds.

The triggering function of the CSON node of the present system provides according to this example the following basic functionality:

Real time analysis of ongoing performance metrics and indicators.

Predictive trend analysis which relies on historic values of KPIs to identify time dependent patterns and predict their values in a future point of time.

Predictive extrapolation of KPI values relying on related real time parameters, signaling and data information obtained in a better time granularity than the relevant KPIs (i.e. obtained either continuously or in intervals that are substantially shorter than the intervals at which the values of the relevant KPIs are obtained).

Proactive threshold crossing checking of critical Key Performance Indicators (KPIs) based on trending, to indicate severe degradation in performance or lack of available resources.

In prior art optimization approaches, key performance indicator (KPI) data is retrieved from the OSS by processing information collected over 15 minutes (3GPP standard), or typically 15 minutes to 1 hour, or more.

In order to enable dynamic optimization of the radio network performance, sampling and processing of information relating to radio network performance KPIs should preferably be performed more frequently and preferably at a level of an individual cell. Relying only on OSS PM sampling, limits the dynamic capabilities of the external SON platform to whatever time granularity is used, down to a minimal value of 15 minutes. By probing the Iu or Iur, Iuh, Iub, X2, S1 interfaces of the cellular network in real time, the present system can generate more meaningful and accurate performance indicators at both the signaling and traffic (voice/data) levels.

Figure 2:
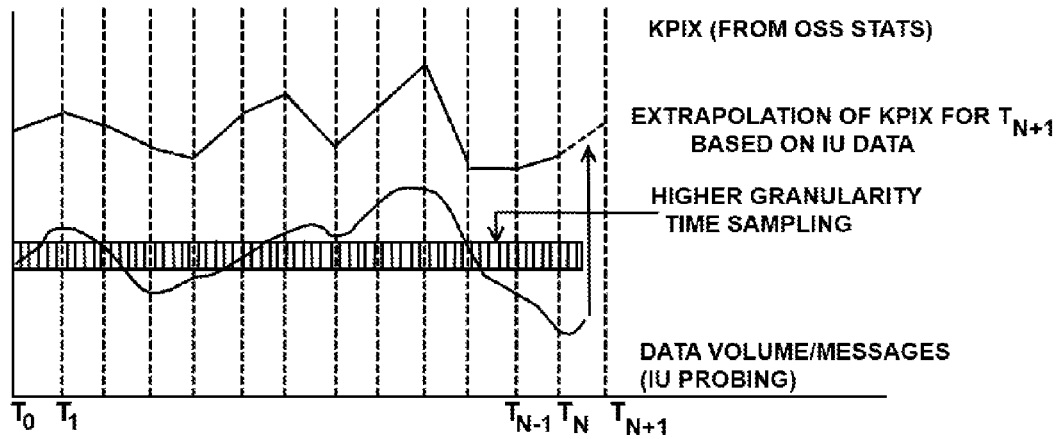
FIG. 2 is a graph illustrating information sampling and KPI correlating as effected using the present system.

FIG. 2 exemplifies how the CSON node of the present system utilizes the Iu information to derive indicator trends and to predict future network performance.

As is shown in the graph of FIG. 2, a trend is derived from the near real time data (signaling and traffic) obtained from probing the Iu interface activity, and is then used to predict the next data point of the OSS KPI.

Correlation between the trend and the next data point includes building an estimated cell working point derived from the available historical performance KPIs and status indicators, then, real time (or rather near real time) activity indicators are obtained from the CN-RAN interface (e.g. Iu Interface). Finally, an estimated prediction of the next working point of the cell performance is calculated based on the near real time activity indicators.

The triggering function of the processor then considers the predicted data point and makes a decision which (optimization) applications to trigger and when, preferably in a proactive and automated manner.

Inputs to the triggering function can be, for example any one or more of the following:
OSS PM counters per cell;
Iu CS data volume (instantaneous number of active links);
Iu PS data volume (instantaneous payload);
Iu CS signaling messages, message type counts per sampling interval;
Events and events causes based on Iu signaling processing in real time;
Per cell counters from RNC traces; and the like.

The information derived from the Iu interface can be accumulated on a per Common Gateway Interface ("CGI") and per link basis to enable the SON to make the decisions on a per cell level.

The following provides an example of a typical Iu signaling information that can be used to identify cell status in near real time in regards to a call setup attempt (the number in parenthesis indicate a root cause code for this specific message as defined in the 3GPP specifications):
RANAP: RAB (Radio Access Bearer) assignment reject Possible causes:
RAB pre-empted (1),
Trelocoverall Expiry (2),
Trelocprep Expiry (3),
Treloccomplete Expiry (4),
Tqueuing Expiry (5),
Relocation Triggered (6),
Unable to Establish During Relocation (8),
Unknown Target RNC (9),
Relocation Cancelled (10),
Successful Relocation (11),
Requested Ciphering and/or Integrity Protection Algorithms not Supported (12),
Conflict with already existing Integrity protection and/or Ciphering information (13),
Failure in the Radio Interface Procedure (14),
Release due to UTRAN Generated Reason (15),
User Inactivity (16), Time Critical Relocation (17),
Requested Traffic Class not Available (18),
Invalid RAB Parameters Value (19),
Requested Maximum Bit Rate not Available (20),
Requested Maximum Bit Rate for DL not Available (33),
Requested Maximum Bit Rate for UL not Available (34),
Requested Guaranteed Bit Rate not Available (21),
Requested Guaranteed Bit Rate for DL not Available (35),
Requested Guaranteed Bit Rate for UL not Available (36),
Requested Transfer Delay not Achievable (22),
Invalid RAB Parameters Combination (23),
Condition Violation for SDU Parameters (24),
Condition Violation for Traffic Handling Priority (25),
Condition Violation for Guaranteed Bit Rate (26),
User Plane Versions not Supported (27),
Iu UP Failure (28),
TRELOCalloc Expiry (7),
Relocation Failure in Target CN/RNC or Target System (29),
Invalid RAB ID (30),
No remaining RAB (31),
Interaction with other procedure (32),
Repeated Integrity Checking Failure (37),
Requested Request Type not supported (38),
Request superseded (39),
Release due to UE generated signalling connection release (40),
Resource Optimisation Relocation (41),
Requested Information Not Available (42),
Relocation desirable for radio reasons (43),
Relocation not supported in Target RNC or Target system (44),
Directed Retry (45),
Radio Connection With UE Lost (46),
RNC unable to establish all RFCs (47),
Deciphering Keys Not Available (48),
Dedicated Assistance data Not Available (49),
Relocation Target not allowed (50),
Location Reporting Congestion (51),
Reduce Load in Serving Cell (52),
No Radio Resources Available in Target cell (53),
GERAN Iu-mode failure (54),
Access Restricted Due to Shared Networks (55),
Incoming Relocation Not Supported Due To PUESBINE Feature (56),
Traffic Load In The Target Cell Higher Than In The Source Cell (57), These or part of these messages which are collected by the present system from the Iu interface, may be used to construct a snapshot of the cell status, as exemplified in Table 1 below.

TABLE 1

| Cell | KPI#1: Number of call attempts | KPI#2: Number of rejected attempts | KPI#3: % rejected due to high traffic load | KPI#4: % rejected due to UTRAN problem | KPI#n: More reasons . . . |
|---|---|---|---|---|---|
| A | 10 | 3 | 1 | 1 | 1 |
| B | 100 | 5 | 5 | 0 | 0 |

The generated performance indicators can be correlated to the OSS KPIs and used to identify a trend in data sampled over a short period of time (seconds to minutes).

Figure 3A:
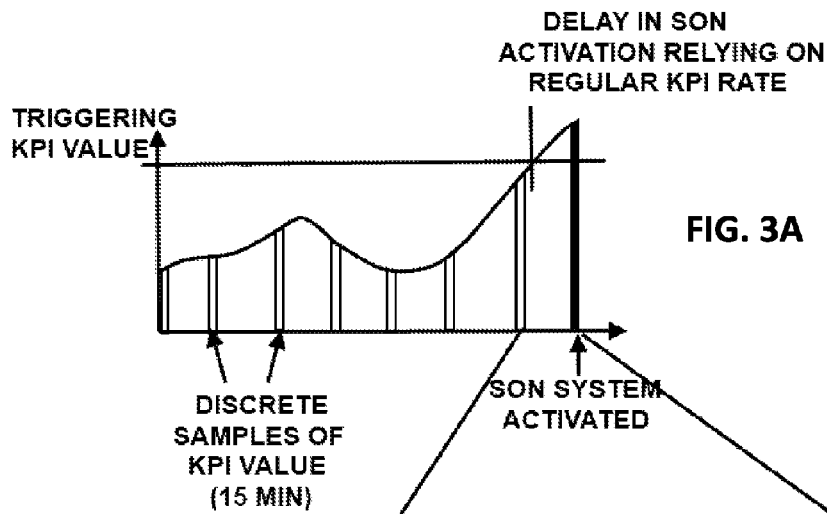
FIGS. 3A-3C illustrate information sampling and processing by a prior art system (FIG. 3a) and the present system (FIGS. 3b-c) emphasizing the differences in time sampling and information processing.
Figure 3B:
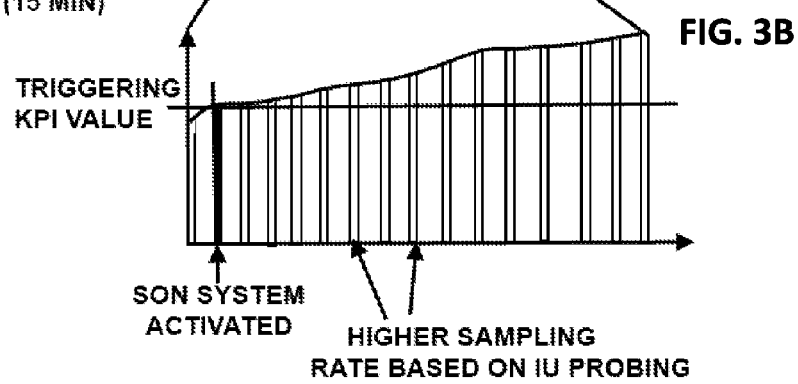
Figure 3C:
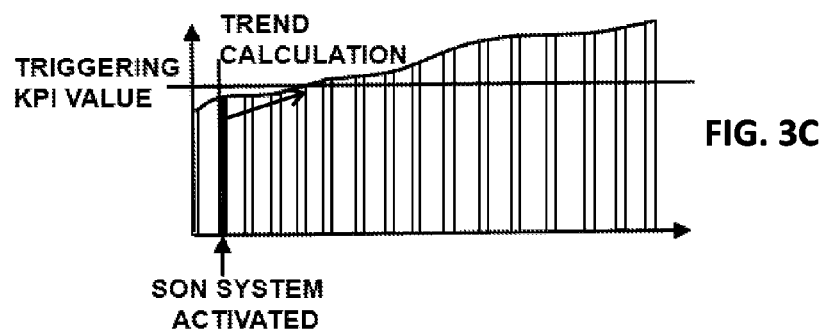

The difference between the approach taken by the present invention and that of the prior art systems, may further be understood by reviewing the examples demonstrated in FIGS. 3A to 3C.

FIG. 3A demonstrates a typical prior art sampling approach, which is based on periodic sampling of files outputted by OSS PM (typically generated every 15 minutes). Considering a SON functionality which is triggered by threshold crossing of such KPI, the time resolution in which such SON functionality can be operated is not less than the OSS generated PMs, which in this case is 15 minutes.

FIGS. 3B and 3C illustrate the effect of data collection and analysis by using the solution of the present invention. FIG. 3B presents a case of earlier detection of threshold crossing which is possible due to the fact that the time resolution of a pKPI calculated from the information obtained according to the present system from the network interfaces, is substantially shorter that the OSS KPIs. FIG. 3C presents a case of earlier triggering of a SON system by using a trending function based on the new samples obtained from the network interfaces. This approach enables calculating the KPI (pKPI) before a threshold value is reached, and enables triggering the SON functionality based on a predictive trending function, thus allowing for proactive activation of the SON functionality.

Thus, the present invention provides a novel approach for correlating between information obtained in real time from the CN-RAN interfaces (signaling, data, etc.) and network level KPIs measured and averaged over substantially longer time periods (e.g. 15 minutes) to enable a reliable predictive triggering for automated optimization applications. In addition, the present invention provides a method for implementing this new approach based on a novel network element, a Centralized SON Node (CSON Node). This node is operative to communicate with the OSS (Operation and Support System) of the cellular network as well as with the main interfaces of the core and radio networks.

EXAMPLES

Reference is now made to the following examples, which, together with the above descriptions, illustrate the invention in a non limiting fashion.

Load Balancing

The present system can be used for load balancing of traffic between cells of the radio network. The target of the load balancing function is to improve the efficiency of the radio resources deployed in each cell of the cellular system, thereby allowing postponing of further CAPEX and OPEX investments that would have been incurred by the operator if new radio equipment is required to support the traffic growth.

The efficiency of the load balancing application depends greatly on the speed of identifying when a load is being developed at each cell, and consequently, adjusting network settings in an appropriate and efficient manner to accommodate that process.

At present, two main approaches are deployed in radio networks to achieve this goal:

Local decision taken by a specific Node B (base station) during specific call setup of specific call proceedings. By this approach, the Node B itself decides on routing the call to either of the cells under its control (a Node B may be associated with several cells). These decisions can be taken rapidly due to the fact that all the cells of the Node B are controlled locally by the same processor that has the visibility of their resource utilization, and can effectively intervene in the call process without causing too much delay which can negatively impact the end user experience.

At the network level, load balancing decisions can be taken after a longer time period, based upon historical statistical data collected by the network elements and accumulated in network performance counters. The main limitation of this method is that the load balancing function cannot be activated until statistical data is collected by the OSS for it can act upon. In standard cellular network implementations, the minimal time in which these counters may be provided to the OSS is no less than 15 minutes, and in many cases it is even more than that.

In contrast to prior art approaches, the system of the present invention provides a network level load balancing function having a near real time visibility of the load state of one or more cells, thus enabling near real time correction of network settings and prevention of future network performance degradation.

Figure 4:
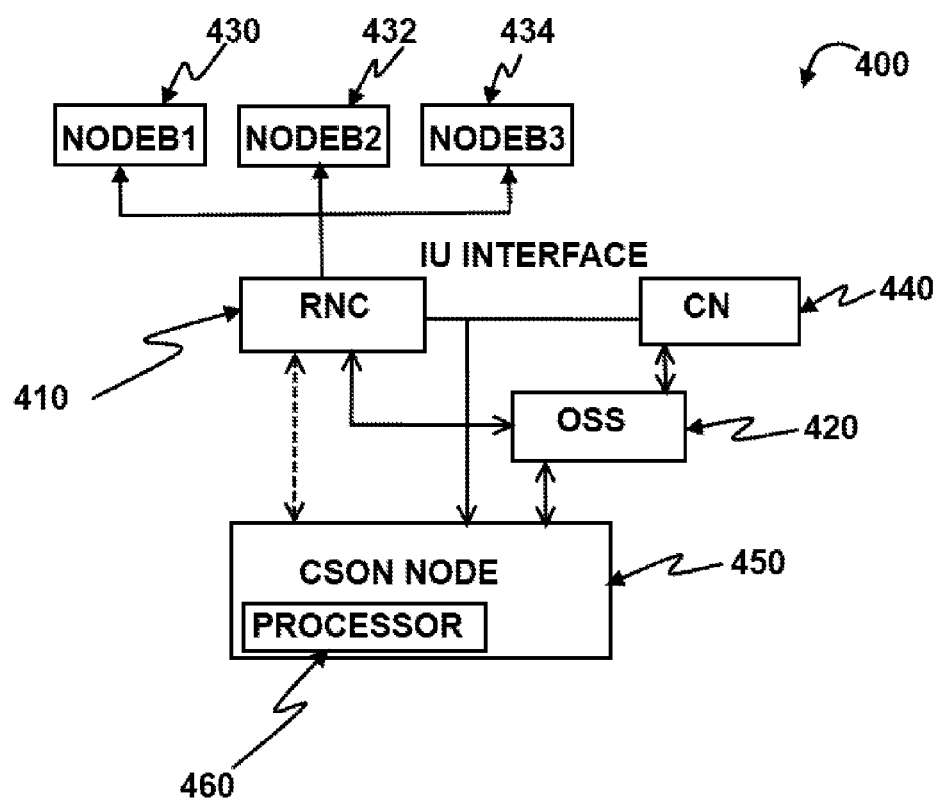
FIG. 4 illustrates implementation of the present system into a typical cellular network architecture showing the radio network controller and Nodes of the radio access network.

FIG. 4 illustrates cellular network architecture 400 including the Radio Network Controller (RNC) 410, the Operations and Support System (OSS) 420, a plurality of NodeB's 430, 432 and 434 as well as the Core Network (CN) 440 and Centralized SON server 450. The cSON comprising a processor 460 adapted to receive the probed information from the Iu interface, which interconnects the RAN and the CN, but it can also utilize any RAN or CN interface for the general case.

In addition to interface probing, the cSON server also gets OSS information, such as PM files, as well as RNC traces, either directly from the NodeB itself, or via the OSS platform.

The system probes the Iu interface for information such as Initial UE Messages and/or Location Reports which can be related to a certain cell. It then builds a learning function (prediction) that will determine, based on trends of indicators correlated with performance parameters, what is the load that is being developed on the radio resources, and if that load justifies to activate the load balancing function. This activating decision may also be based on the load condition occurring in neighbor cells of the observed cluster.

The CSON builds a real time visibility of the load state in the UTRAN based on the Iu interface probed information and calculates a predicted value of the relevant performance metrics (KPIs) which are relevant for the SON activation.

For example, a pKPI generated by the present system can be used to represent a load state of a radio resource load (e.g. power) and using a real time statistic of instantaneous number of calls which is probed via the Iu interface, the present system is operative to build a correlation function between this pKPI and the power resource load of that cell. Preferably, the present system enables generation of such a correlation function for each cell of the network. Using this function it is possible to predict a value of a relevant KPI of a SON application at any future time (e.g. seconds to minutes). Such predicted KPIs can then be used to build a trend function which can serve as a further indicator of the network performance.

For example, Table 2 below provides the change in a number of instantaneous voice links over a period of 6 seconds. The predicted load indicator value (a function of the trend described above) for the next PM counter interval ($T_{1000}$) is derived by the present system as described above. Let us assume that in the NodeB1 base station 430, the trend in an indicator relating to real time statistics of instantaneous number of calls is generally positive and thus the predicted load in $T_{1000}$ is assigned a value of 1 indicating that the network is capable of supporting more traffic.

For NodeB2 432, the trend of an indicator relating to real time statistics of instantaneous number of calls is generally negative and thus the predicted load in $T_{1000}$ is assigned a value of 3 indicating that the network is congested.

For NodeB3 434, the trend of an indicator relating to real time statistics of instantaneous number of calls is generally neutral and thus the predicted load in $T_{1000}$ is assigned a value of 2 indicating that the network is experiencing a moderate load but is not congested.

TABLE 2

| Base Station | Number of instantaneous voice links | | | | | | | Predicted load in $T_{1000}$ (next PM period)* |
|---|---|---|---|---|---|---|---|---|
| | $T_0$ | $T_1$ | $T_2$ | $T_3$ | $T_4$ | $T_5$ | $T_6$ | |
| NodeB1 | 20 | 12 | 13 | 16 | 18 | 17 | 16 | 1 |
| NodeB2 | 30 | 31 | 23 | 32 | 39 | 42 | 45 | 3 |
| NodeB3 | 25 | 25 | 26 | 26 | 25 | 26 | 26 | 2 |

Load levels:
1—unloaded
2—low load
3—heavy load

The predicted load indicator (at $T_{1000}$) can then be used by the CSON processor 460 for initiating load balancing related actions such as:

Change parameter in source and target cells in order to cause users being in either idle or active modes to move from cell A (loaded) to cell B (less loaded).

Modify the RF footprint of the source and target cells (e.g. perform "RF shaping" actions) in order to offload the loaded cell by decreasing its area of influence.

By implementing such load balancing related actions, the load in specific cell may be regulated, thereby enable the network operator to achieve a better performance of this network.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A computing platform comprising a processor that operates to execute instructions for optimizing operation of a cellular network, wherein when executing said instructions, said computing platform operates to:
   (a) probe for information exchanged between a mobile access network and a core network of the cellular network;
   (b) retrieve statistical KPIs generated from a plurality of network elements belonging to the cellular network;
   (c) generate a predictive Key Performance Indicator (pKPI) by correlating said probed information with said retrieved statistical KPIs, thereby enabling to predict a trend characterizing future performance of at least one network element belonging to the cellular network; and
   (d) trigger one or more changes in the operation of the cellular network based on the predicted trend characterizing future performance of the at least one network element belonging to the cellular network,
   and wherein the probing for information exchanged between a mobile access network and a core network is carried out at a rate higher than a rate of retrieving statistical KPIs generated from the plurality of network elements.

2. The computing platform of claim 1, wherein the probing for information exchanged between a mobile access network and a core network is carried out at near real time intervals.

3. The computing platform of claim 2, wherein each of the near real time intervals is less than a 3rd Generation Partnership Project (3GPP) standard time frame.

4. The computing platform of claim 1, wherein the one or more changes triggered are characterized as being preventive activities in the network operation.

5. The computing platform of claim 1, wherein the at least one network element belonging to the cellular network is at least one wireless cell.

6. The computing platform of claim 1, further operative to monitor a trend in said indicator (pKPI) over a predetermined time period.

7. The computing platform of claim 1, wherein the one or more changes triggered in the operation of the cellular network result in a decrease in traffic load being developed at at least one of the wireless cells of the cellular network.

8. The computing platform of claim 7, wherein the one or more triggered changes comprise at least one of the following:
   (i) causing users being in either idle or active modes to move from a first congested wireless cell to a second non-congested wireless cell; and
   (ii) decreasing an area serviced by a base station associated with the first congested wireless cell, thereby reducing the network resource load threat.

9. The computing platform of claim 1, wherein the information exchanged between a mobile access network and a core network of the cellular network comprises control information.

10. The computing platform of claim 1, wherein the information exchanged between a mobile access network and a core network of the cellular network comprises user data information.

11. A method for optimizing operation of a cellular network, wherein said method comprises the steps of:
   (a) probing for information exchanged between a mobile access network and a core network of the cellular network, wherein the probing is performed using a processor of a computing platform;
   (b) retrieving using the processor statistical KPIs generated from a plurality of network elements belonging to the cellular network;
   (c) generating a predictive key performance indicator (pKPI) by correlating said probed information with said retrieved statistical KPIs, thereby enabling to predict a trend characterizing future performance of at least one network element belonging to the cellular network; and
   (d) triggering one or more changes in the operation of the cellular network based on the predicted trend which characterizes the future performance of the at least one network element belonging to the cellular network,
   and wherein the probing for information exchanged between a mobile access network and a core network is carried out at a rate higher than a rate of retrieving statistical KPIs generated from the plurality of network elements.

12. The method of claim 11, wherein the step of probing for information exchanged between a mobile access network and a core network is carried out at near real time intervals.

13. The method of claim 12, wherein each of the near real time intervals extends for less than the duration of a 3rd Generation Partnership Project (3GPP) standard time frame.

14. The method of claim 11, wherein the one or more triggered changes are characterized as being preventive activities in the network operation.

15. The method of claim 11, wherein the at least one network element belonging to the cellular network is at least one wireless cell.

16. The method of claim 11, further comprising a step of monitoring a trend in the value of said indicator (pKPI) over a predetermined time period.

17. The method of claim 11, wherein the one or more triggered changes result in decreasing traffic load being developed at at least one of the wireless cells of the cellular network.

18. The method of claim 17, wherein the one or more changes comprise at least one of the following:
   (i) causing users being in either idle or active modes to move from a first congested wireless cell to a second non-congested wireless cell; and
   (ii) decreasing an area serviced by a base station associated with the first congested wireless cell, thereby reducing the traffic load thereat.

* * * * *